United States Patent
Kim et al.

(10) Patent No.: US 9,101,941 B2
(45) Date of Patent: Aug. 11, 2015

(54) ACTIVATED CARBON FOR SIMULTANEOUS REMOVAL OF DUST AND GASEOUS AIR POLLUTANTS AND METHOD OF PREPARING ACTIVATED CARBON ELECTRODE PLATE USING THE SAME

(75) Inventors: Kwang Soo Kim, Gyeonggi-do (KR); Jung O Park, Gwangju (KR)

(73) Assignees: KOREA INSTITUTE OF CONSTRUCTION TECHNOLOGY, Gyeonggi-do (KR); SINHAENG CO., LTD., Gyeonggi-do (KR)

( * ) Notice: Subject to any disclaimer, the term of this patent is extended or adjusted under 35 U.S.C. 154(b) by 551 days.

(21) Appl. No.: 13/441,646

(22) Filed: Apr. 6, 2012

(65) Prior Publication Data
US 2012/0255444 A1 Oct. 11, 2012

(30) Foreign Application Priority Data
Apr. 6, 2011 (KR) ........................ 10-2011-0031740

(51) Int. Cl.
*B03C 3/47* (2006.01)
*B05D 5/12* (2006.01)
(Continued)

(52) U.S. Cl.
CPC . *B03C 3/60* (2013.01); *B01D 53/32* (2013.01); *B03C 3/41* (2013.01); *B03C 3/47* (2013.01); *C01B 31/083* (2013.01); *H01B 1/04* (2013.01); *B01D 53/52* (2013.01); *B01D 53/58* (2013.01);
(Continued)

(58) Field of Classification Search
CPC .............. B03C 3/41; B03C 3/47; B03C 3/60; B01D 53/32; B01D 53/52; B01D 53/58; B01D 2257/90; B01D 2257/304; B01D 2257/406; B01D 2257/7027; B01D 2257/708; B01D 53/72; C01B 31/083; H01B 1/04
USPC ................... 95/59; 96/15–100; 252/500–517; 427/74, 77, 79, 372.2, 457, 580; 428/424.4
See application file for complete search history.

(56) References Cited

U.S. PATENT DOCUMENTS

| | | | | |
|---|---|---|---|---|
| 5,776,633 | A | * | 7/1998 | Mrotek et al. ............. 429/231.8 |
| 6,097,011 | A | * | 8/2000 | Gadkaree et al. ............. 219/553 |

(Continued)

FOREIGN PATENT DOCUMENTS

| | | |
|---|---|---|
| JP | 09-156914 | 6/1997 |
| JP | 2000-007315 | 1/2000 |

(Continued)

*Primary Examiner* — Duane Smith
*Assistant Examiner* — Sonji Turner
(74) *Attorney, Agent, or Firm* — IP & T Group LLP

(57) ABSTRACT

The present invention provides an activated carbon which is used in an activated carbon electrode plate and a method of preparing an activated carbon electrode plate prepared using the same, in which the activated carbon electrode plate functions to remove gas and gaseous air pollutants at the same time. The method comprises the steps of: providing a raw pure activated carbon or an impurity-containing raw activated carbon; processing the raw activated carbon into a powdered activated carbon; treating the pores of the powdered activated carbon to maintain the pores; filtering the powdered activated carbon whose pores were treated, and mixing the filtered activated carbon with a binder to form a binder/activated carbon mixture; forming the binder/activated carbon mixture into a flowable activated carbon slurry; applying the activated carbon slurry to the surface of a conductive material; and drying the conductive material having the activated carbon slurry applied thereto.

7 Claims, 4 Drawing Sheets

(51) Int. Cl.
*B03C 3/60* (2006.01)
*B03C 3/41* (2006.01)
*B01D 53/32* (2006.01)
*C01B 31/08* (2006.01)
*H01B 1/04* (2006.01)
*B01D 53/52* (2006.01)
*B01D 53/58* (2006.01)
*B01D 53/72* (2006.01)

(52) U.S. Cl.
CPC ........... *B01D 53/72* (2013.01); *B01D 2257/304* (2013.01); *B01D 2257/406* (2013.01); *B01D 2257/708* (2013.01); *B01D 2257/7027* (2013.01); *B01D 2257/90* (2013.01)

(56) References Cited

U.S. PATENT DOCUMENTS

| | | | |
|---|---|---|---|
| 6,194,650 B1 * | 2/2001 | Wakayama et al. | 136/256 |
| 6,493,210 B2 * | 12/2002 | Nonaka et al. | 361/502 |
| 6,654,229 B2 * | 11/2003 | Yanagisawa et al. | 361/502 |
| 7,224,574 B2 * | 5/2007 | Fujino et al. | 361/502 |
| 7,625,839 B2 * | 12/2009 | Hirahara et al. | 502/432 |
| 7,646,587 B2 * | 1/2010 | Ohmori | 361/502 |
| 8,085,526 B2 * | 12/2011 | Ohmori | 361/502 |
| 2005/0266150 A1 * | 12/2005 | Yong et al. | 427/58 |
| 2008/0138696 A1 * | 6/2008 | Bartling | 429/42 |
| 2009/0152510 A1 * | 6/2009 | Ito | 252/511 |
| 2010/0002357 A1 * | 1/2010 | Kim et al. | 361/305 |
| 2010/0296226 A1 * | 11/2010 | Nanba et al. | 361/502 |
| 2011/0002086 A1 * | 1/2011 | Feaver et al. | 361/502 |
| 2011/0008531 A1 * | 1/2011 | Mikhaylik et al. | 427/77 |
| 2012/0063060 A1 * | 3/2012 | Ohmori | 361/502 |
| 2012/0237828 A1 * | 9/2012 | Tan et al. | 429/221 |
| 2013/0040199 A1 * | 2/2013 | Yamamura | 429/218.1 |
| 2013/0059205 A1 * | 3/2013 | Yamamura et al. | 429/231.8 |

FOREIGN PATENT DOCUMENTS

| | | |
|---|---|---|
| JP | 2003-173941 | 6/2003 |
| KR | 1020020005202 | 1/2002 |
| KR | 100798429 | 1/2008 |
| KR | 1020090066881 | 6/2009 |

* cited by examiner

ACTIVATED CARBON FOR SIMULTANEOUS REMOVAL OF DUST AND GASEOUS AIR POLLUTANTS AND METHOD OF PREPARING ACTIVATED CARBON ELECTRODE PLATE USING THE SAME

CROSS-REFERENCES TO RELATED APPLICATIONS

The present application claims priority of Korean Patent Application No. 10-2011-0031740, filed on Apr. 6, 2011, which is incorporated herein by reference in its entirety.

BACKGROUND OF THE INVENTION

1. Field of the Invention

The present invention relates to an activated carbon which is used in an activated carbon electrode plate for removing air pollutants, including dust and offensive odor substances, and a method of preparing an activated carbon electrode plate. More specifically, the present invention relates to an activated carbon which is used in an activated carbon electrode plate and to a method of preparing an activated carbon electrode plate using the same, in which the activated carbon can maximize the specific surface area of the electrode to make the distribution of current uniform, thereby maximizing the adhesion of suspended matter, and can also remove volatile organic substances and offensive odor substances from gases.

2. Description of Related Art

During the last few years, rapid urbanization and industrialization have led to increases in the emission of smoke from vehicles and factories and caused air pollution not only indoor environments, but also in public environments, such as tunnels, subway stations, theaters and the like. Such air pollution problems have become serious social issues.

In addition, due to the recent frequent occurrence of yellow sand events, public consciousness of the need to control air pollution has increased. The major air pollutants are dust particles, volatile organic substances and offensive odor substances.

One example of methods for removing dust particles among air pollutants is an electric dust collector. This electric dust collector generally comprises a charging unit that creates corona discharge to electrically charge dust particles, and a dust removal unit that removes the electrically charged dust particles by allowing the dust particles to adhere to an electrode plate.

However, this electric dust collector has a problem in that high-voltage direct current is required for corona discharge, indicating that a large amount of electricity is consumed.

Furthermore, the electrode plate in the electric dust collector is generally made of a stainless steel or iron plate. However, the iron plate has problems in that the specific surface area to which dust particles adhere is low and current density is concentrated on the edges of the electrode plate such that dust particles do not uniformly adhere to the surface of the electrode plate. In addition, in the electric dust collector, ozone ($O_3$) is formed by reaction with the oxygen in the air during corona discharge, and for this reason, an ozone removal unit needs to be provided following the dust removal unit. Furthermore, a material to be removed by the electric dust collector is limited only to dust, and thus the electric dust collector cannot remove volatile organic substances such as benzene and toluene, or offensive odor substances such as ammonia ($NH_3$) gas and hydrogen sulfide ($H_2S$) gas.

SUMMARY OF THE INVENTION

Accordingly, the present invention has been made in view of the problems occurring in the prior art, and it is an object of the present invention to provide an activated carbon which is used in an activated carbon electrode plate for simultaneous removal of dust, volatile organic substances and offensive odor substances, in which the activated carbon enables the specific surface area of the electrode plate to be increased, leading to an increase in the electrode plate's area for adhesion of dust, and allows current density to be distributed uniformly throughout the electrode plate such that dust adheres uniformly to the electrode plate, and the activated carbon allows for simultaneous removal of dust, volatile organic substances and odor offensive substances.

Another object of the present invention is to provide a method for preparing an activated carbon electrode plate coated with an activated carbon, in which the activated carbon is prepared from a modified, plant- or coal-derived activated carbon having reduced electrical resistance, the pores of the activated carbon are not blocked even when a binder is added to the activated carbon, and the activated carbon maintains its inherent function.

To achieve the above objects, in accordance with a first aspect of the present invention, there is provided a method for preparing an activated carbon for an activated carbon electrode plate, the method comprising the steps of: providing a raw activated carbon; processing the raw activated carbon into powdered activated carbon; and treating the pores of the powdered activated carbon in order to maintain the pores.

When the raw activated carbon in the step of providing the raw activated carbon is at least one impurity-containing activated carbon of a plant-derived activated carbon and a coal-derived activated carbon, the method of the present invention further comprises a pretreatment step of removing impurities from the impurity-containing activated carbon to obtain a pure activated carbon.

The pretreatment step may comprise the steps of: stirring an impurity-containing powdered activated carbon in a hydrochloric acid solution of a predetermined hydrochloric acid concentration for a predetermined time to elute metal ions from the activated carbon; dehydrating the powdered activated carbon from which the metal ions were eluted; and drying the dehydrated activated carbon to remove water from the pores of the activated carbon.

The step of treating the pores of the activated carbon may comprise adding the powdered activated carbon to a volatile solvent, which can be volatilized at room temperature, and applying a predetermined pressure thereto so as to fill the volatile solvent into the pores of the powdered activated carbon.

In accordance with a second aspect of the present invention, there is provided an activated carbon for an activated carbon electrode plate, prepared by said method for preparing the activated carbon.

In accordance with a third aspect of the present invention, there is provided a method for preparing an activated carbon electrode plate, the method comprising the steps of: mixing the powdered activated carbon as described above with a binder to form a binder/activated carbon mixture; forming a activated carbon slurry from the binder/powdered carbon mixture; applying the activated carbon slurry to the surface of a conductive material; and drying the conductive material having the activated carbon slurry applied thereto.

The binder that is used in the step of forming the binder/activated carbon mixture is preferably polyvinyl acetate (PVA).

The step of forming the activated carbon slurry is preferably performed by adding a volatile solvent to the binder/activated carbon mixture.

The step of mixing the powdered activated carbon with the binder further comprises adding a highly conductive material for increasing electrical conductivity, in which the highly conductive material is carbon black.

The powdered activated carbon, the binder and the carbon black are mixed with each other by weight of 1 part (powdered activated carbon), 0.2 part (binder) and 0.2 part (carbon black).

The step of drying the conductive material comprises drying the conductive material at room temperature, and drying the conductive material at a temperature at which the volatile solvent volatilizes.

In accordance with a fourth aspect of the present invention, there is an activated carbon electrode plate prepared by said method.

BRIEF DESCRIPTION OF THE DRAWINGS

The above and other objects, features and advantages of the present invention will be more clearly understood from the following detailed description taken in conjunction with the accompanying drawing, in which.

DESCRIPTION OF SPECIFIC EMBODIMENTS

Figure 1:
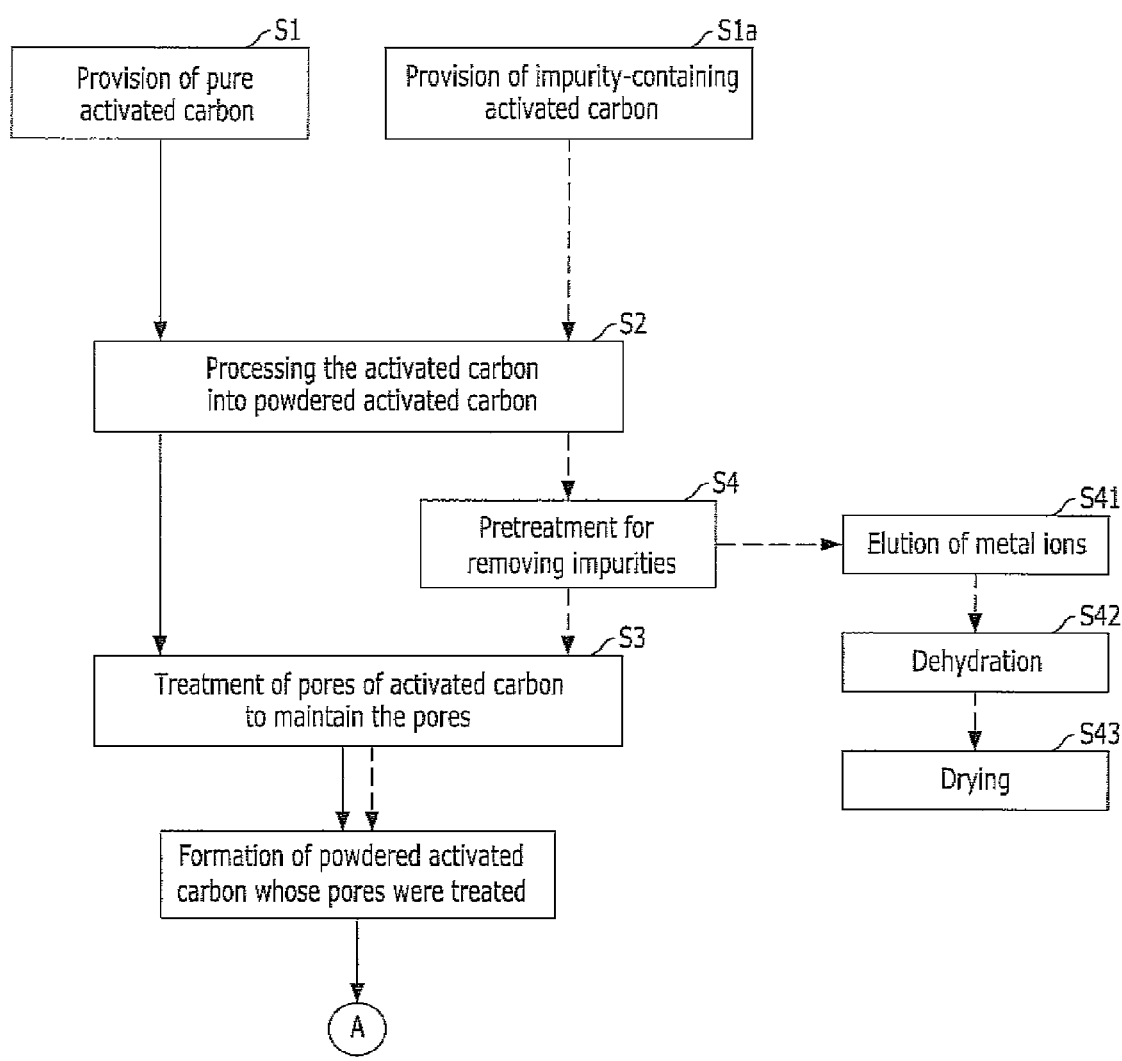
FIG. 1 is a flowchart showing a method for preparing an activated carbon for an activated carbon electrode plate for simultaneous removal of dust and gaseous air pollutants according to a preferred embodiment of the present invention.

Other objects, features and advantages of the present invention will be more apparent from the following detailed description and the accompanying drawings.

A method for preparing an activated carbon for an activated carbon electrode plate for simultaneous removal of dust and gaseous air pollutants comprises the steps of: providing either a raw pure activated carbon or a raw activated carbon including impurities such as metal ions; processing the raw activated carbon into a powdered activated carbon; and treating the pores of the powdered activated carbon in order to maintain the pores.

In addition, a method for fabricating an activated carbon electrode plate for simultaneous removal of dust and gaseous air pollutants comprises the steps of: providing either a raw pure activated carbon or a raw activated carbon including impurities such as metal ions; processing the raw activated carbon into a powdered activated carbon; treating the pores of the powdered activated carbon in order to maintain the pores; filtering the powdered activated carbon whose pores were treated, and mixing the filtered activated carbon with a binder to form a binder/activated carbon mixture; forming the binder/activated carbon mixture into a flowable activated carbon slurry which is easily applied to a conductive material (i.e., an electrode plate); applying the activated carbon slurry to the surface of a conductive material; and drying the conductive material having the activated carbon slurry applied thereto.

Hereinafter, the features of the activated carbon that is the main subject matter of the present invention and a technical idea for adopting it in the present invention will be described before a preferred embodiment of the present invention is described.

Activated carbon that is an amorphous carbon material is porous and has a very high specific surface area of about 1,000 $m^2/g$, and the fine pores thereof have the ability to physically and chemically adsorb air pollutants.

Raw activated carbons include plant-derived activated carbons, such as coconut shells and sawdust, coal-derived activated carbons, such as bituminous coal and brown coal, and activated carbons derived from fibers such as non-woven fabrics.

In order to use this activated carbon as an electrode, the activated carbon should be pure. If the activated carbon contains metal impurities, such as iron, manganese or magnesium ions, the resistance of the electrode will disadvantageously increase. For this reason, fiber-based activated carbon is preferably used. However, the fiber-based activated carbon is very expensive (about 100,000 won per kg), a method for removing metal ions from relatively inexpensive natural activated carbon or coal-based activated carbon is required.

In addition, in order to use activated carbon as an electrode, the activated carbon is coated on the surface of a conductive material to form a thin layer. For this purpose, a binder is required for the adhesion between activated carbon particles and between activated carbon and the surface of the conductive material.

If the pores of activated carbon are blocked when the binder is mixed with the activated carbon, the activated carbons will lose the ability to adsorb air pollutants. For this reason, it is required to open the pores after mixing with the binder.

With reference to the above-described technical idea, a method for fabricating a thin-plate electrode for simultaneous removal of dust and gaseous air pollutants according to a preferred embodiment of the present invention will now be described. FIG. 1 is a flowchart showing a method for preparing an activated carbon for a thin-plate electrode for simultaneous removal of dust and gaseous air pollutants according to a preferred embodiment of the present invention.

As shown in FIG. 1, a method for preparing an activated carbon for a thin-plate electrode for simultaneous removal of dust and gaseous air pollutants according to the present invention comprises the steps of: (S1) providing a raw activated carbon material; (S2) processing the raw activated carbon material into a powdered activated carbon; and (S3) treating the pores of the powdered activated carbon in order to maintain the pores.

In step (S1) of providing the raw activated carbon, either a raw activated carbon derived from fibers such as non-woven fabrics, or a raw activated carbon containing impurities such as metal ions, for example, an easily available plant-derived activated carbon or coal-derived activated carbon material, is provided.

In step (S2) of processing the raw activated carbon into the powdered activated carbon, any method may be used, so long as it can form activated carbon powder from the raw activated carbon.

Meanwhile, in the case of an impurity-containing activated carbon (S1a), the plant- or coal-derived activated carbon contains a trace amount of impurities (metal salt compounds) in addition to amorphous carbon that is the main component, and the metal salt compounds act as non-conductors to increase the resistance of an electrode plate to which the activated carbon is to be applied. For this reason, a process of treating the activated carbon so as to contain a carbon component only is required. Thus, according to the present invention, the activated carbon containing impurities such as metal ions is subjected to a pretreatment step (S4) of removing impurities, after step (S2) of processing the activated carbon into powdered activated carbon.

The pretreatment step (S4) comprises the steps of: (S41) of stirring the powdered activated carbon in a hydrochloric acid solution of a predetermined hydrochloric acid concentration (e.g., about 1N) for a predetermined time (e.g., about 1 hour) to elute metal ions from the activated carbon; (S42) dehydrating the powdered activated carbon from which metal ions were eluted; and (S43) drying the dehydrated activated carbon at a predetermined temperature (e.g., about 200° C.) to completely remove water and air from the pores of the dehydrated activated carbon.

A binder is added to the dried powdered activated carbon (pure activated carbon or the activated carbon from which impurities were removed) such that the activated carbon can be attached to the electrode plate. In this case, the pores of the activated carbon can be blocked with the binder, or the pores cannot be restored after the binder is cured. For this reason, the dried powdered activated carbon is subjected to step (S3) of maintaining the pores of the activated carbon.

In step (S3) of maintaining the pores of the activated carbon, the activated carbon is added to a volatile solvent, such as methanol, ethanol or acetone, which can volatilize even at room temperature, and a pressure of about 1 atm is applied thereto such that the volatile solvent is filled into the pores of the activated carbon.

Through the above-described process, an activated carbon for use in a thin-plate electrode or the like is prepared.

Hereinafter, a process of preparing an activated carbon electrode plate using the activated carbon prepared as described above will be described in detail with reference to FIG. 2.

Figure 2:
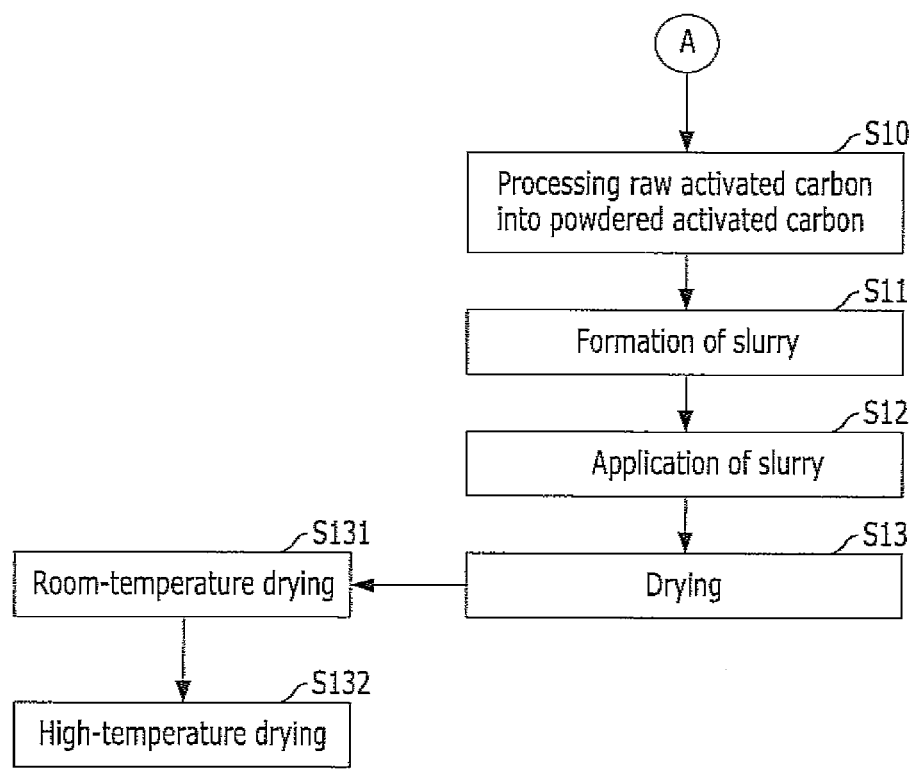
FIG. 2 is a flowchart showing a method for fabricating an activated carbon electrode plate for simultaneous removal of dust and gaseous air pollutants according to a preferred embodiment of the present invention.

FIG. 2 is a flowchart showing a method for preparing an activated carbon electrode plate for simultaneous removal of dust and gaseous air pollutants according to a preferred embodiment of the present invention.

As shown in FIG. 2, a method for preparing an activated carbon electrode plate for simultaneous removal of dust and gaseous air pollutants according to a preferred embodiment of the present invention comprises the steps of: (S10) filtering the powdered activated carbon treated so as to maintain the pores as described above, that is, the activated carbon filled with the volatile solvent, and mixing the filtered activated carbon with a binder to form a binder/activated carbon mixture; (S11) forming the binder/activated carbon mixture into a flowable activated carbon slurry which is easily applied to a conductive material (i.e., an electrode plate); (S12) applying the activated carbon slurry to the surface of a conductive material; and (S13) drying the conductive material having the activated carbon slurry applied thereto.

In step (S10) of forming the binder/activated carbon mixture, polyvinyl acetate (PVA) is used as the binder for the powdered activated carbon. The PVA is relatively inexpensive and has a very high binding strength so as to eliminate the need for mechanical compression. In addition, polyvinylidene fluoride (PVdF) or polytetrafluoroethylene (PTFE), which is a fluorine-based rein, may also be used as the binder.

This binder may also be dissolved in a volatile solvent such as ethanol and mixed with the powdered activated carbon to form a slurry. In this case, the activated carbon layer of an activated carbon electrode plate preparing using the fluorine-based binder has low mechanical strength, and thus needs to be mechanically compressed under a high pressure of, for example, 300 kg/cm$^2$ or above, and the porosity of the activated carbon is not obtained by opening the pores of the activated carbon, but is attributable to the pores remaining after volatilization of the solvent. In addition, the above method of using the binder is used mainly in the fabrication of electrodes for water treatment presses, such as seawater desalination, which require ion exchange.

The main object of the present invention is to remove dust and gaseous air pollutants. Thus, in order to increase the efficiency of removal of dust, the opening of the pores of activated carbon is necessarily required not only for uniform distribution of current density, but also for removal of gaseous pollutants.

Electrodes which are used for dust removal are operated at a high-voltage current of 3 kV or higher, and when activated carbon powder attached to the conductive material of the electrodes is detached and stays in the air, the risk of explosion can occur. For this reason, activated carbon applied to the conductive material should be neither detached, nor peeled off by scratching with a sharp metal point. When PVdF or PTFE which is a fluorine-based resin is used as the binder for the activated carbon for controlling air pollution, the activated carbon powder will be detached from the electrode plate because of the low binding strength of the binder. In addition, when the activated carbon is mechanically compressed, the pores of the activated carbon will lose the ability to physically and chemically adsorb air pollutants. For this reason, polyvinyl acetate (PVA) is preferably used as the binder.

The case in which poly vinyl acetate (PVA) is used as the binder will continue to be described.

In step (S11) of forming the activated carbon slurry, the powdered activated carbon having the volatile solvent (such as methanol or methanol) filled into the pores is mixed with the binder PVA and a carbon black for increasing electrical conductivity. Specifically, the powdered activated carbon, the binder PVA and the carbon black are mixed by weight of 1 part (powdered activated carbon), 0.2 part (binder) and 0.2 part (carbon black), and methanol that is the solvent of PVA is added thereto, thereby forming a flowable slurry which is easily applied to an electrode plate.

If the mixing ratio of the binder relative to the powdered activated carbon is less than 0.2, the adhesion of the powdered activated carbon will be insufficient, and if the ratio is more than 0.3, the electrical resistance of the activated carbon will increase, and thus the amount of carbon black added should be increased. For this reason, the mixing ratio of the binder relative to the powdered activated carbon is preferably 0.2.

In step (S12) of applying the activated carbon slurry, the slurry is poured onto a conductive material such as an iron plate or an aluminum plate and spread thinly (about 0.1 mm) with a roller or a knife.

In drying step (S13), the applied slurry is pre-dried at room temperature for about 6 hours (S131) and post-dried in a dryer at about 100° C. for about 6 hours (S132).

The pre-drying at room temperature is carried out because the activated carbon layer is cracked when it is dried immediately at high temperature. In addition, the post-drying is carried out in order to volatilize the volatile solvent trapped in the pores of the activated carbon, thereby opening the pores blocked with the binder.

In summary, the process for preparing the activated carbon for activated carbon plate electrodes and the process for preparing the activated carbon plate electrode (if impurity-containing activated carbon is used) comprise the steps of: removing metal ions from powdered activated carbon using a solution of about 1N hydrochloric acid (a step of washing the activated carbon with acid); filling a volatile solvent into the pores of the powdered activated carbon (a step of maintaining the pores of the activated carbon); mixing the powdered activated carbon having the volatile solvent filled in the pores, a binder (PVA) and carbon black by weight of 1 part (activated carbon), 0.2 part (PVA) and 0.2 part (carbon black), and adding a methanol solvent to the mixture to form a slurry (a step of adding the binder and forming the slurry); applying the slurry containing the activated carbon to an iron or aluminum plate to a thickness of about 0.1 mm (a step of applying the activated carbon); and drying the applied slurry at room temperature, followed by drying at 100° C., thereby volatilizing the solvent filled in the pores to open the pores (a drying step).

In the present invention, in order to compare the ability to adsorb dust and remove air pollutants between an activated carbon electrode plate and conventional metal plate electrodes, tests were carried out in the following manner.

In the first test, in order to examine the electrical resistance value of the activated carbon electrode, the comparison was performed between an electrode plate consisting of a conventional aluminum metal plate alone, an electrode plate consisting of PVA applied to an aluminum metal plate, an electrode plate consisting of a powdered activated carbon/PVA mixture applied to an aluminum metal plate, and an electrode plate obtained by applying a mixed slurry of powdered activated carbon, PVA and carbon black to an aluminum metal plate.

In the second test, the abilities to adsorb dust and remove gaseous pollutants were compared between an activated carbon electrode plate and conventional aluminum electrode plates. In addition, whether the pores of the activated carbons were open was observed with an electron microscope, and the specific surface areas of the activated carbons were measured for comparison.

Table 1 below shows a comparison of electrical resistance between the electrode plates. As can be seen therein, the aluminum plate alone is a conductor having little or no resistance, but the electrode plate consisting of the binder applied to the aluminum plate showed a resistance value corresponding to a non-conductor, and the electrode plate consisting of the activated carbon applied to the aluminum plate showed a very low resistance value. In addition, the electrode plate consisting of activated carbon/carbon black mixture applied to the aluminum plate showed a resistance value corresponding to a conductor. This suggests that the activated carbon applied to the aluminum plate can be used as an electrode.

TABLE 1

Comparison of electrical resistance between aluminum-plate and activated carbon electrode plate

| Electrode plates | Aluminum plate | PVA applied to aluminum plate | Slurry of PVA + powdered activated carbon applied to aluminum plate | Slurry of PVA + powdered activated carbon + carbon black applied to aluminum plate |
|---|---|---|---|---|
| Resistance (Ω) | 0 | ∞ | 55 | 3 |

In order to examine the ability to remove dust, a voltage of about 5 KV was applied to each of the aluminum electrode plate and the activated carbon electrode plate, and then kaolin dust was passed over the electrode plates for about 1 hour. Then, the weight of dust attached to the positive electrode and negative electrode of each electrode plate was measured, and the results of the measurement are shown in Table 2 below. As can be seen in Table 2, in the case of the aluminum plate, the amount of dust attached was very small, but in the case of the activated carbon electrode plate, the amount of dust attached was about 15 times larger than that of the aluminum plate.

Figure 3:
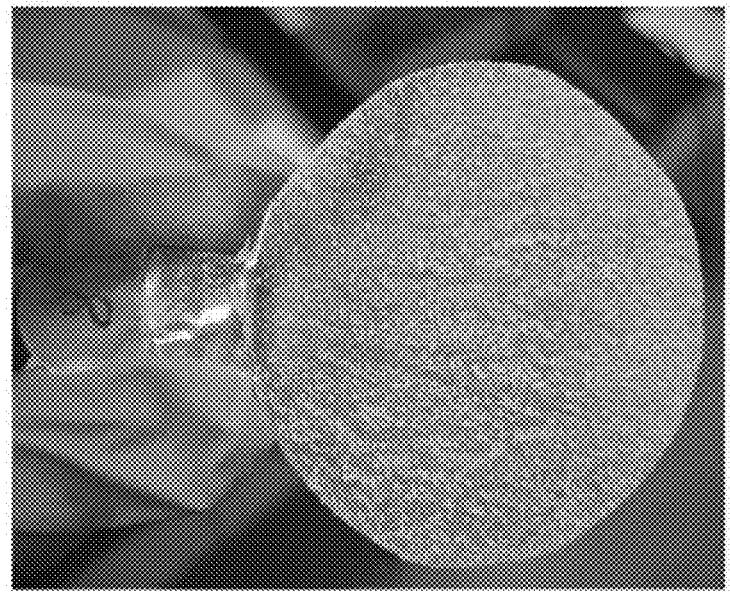
FIG. 3 is a photograph showing dust that adhered to an aluminum plate in a test procedure.
Figure 4:
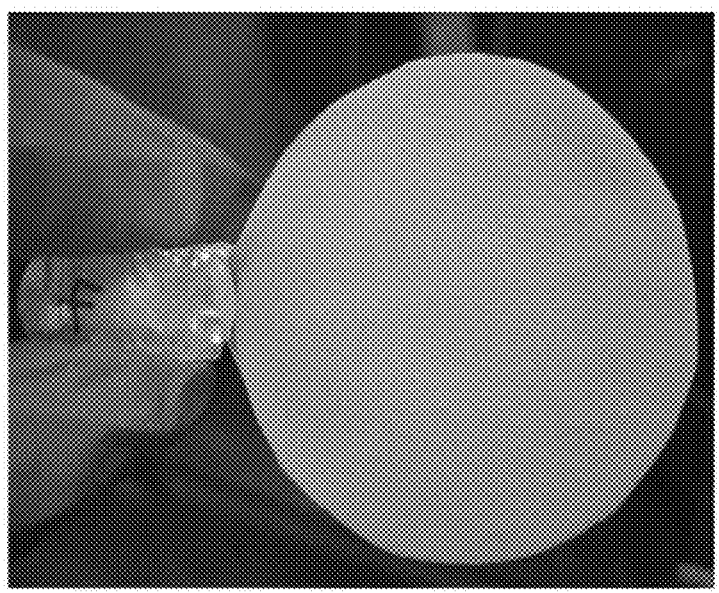
FIG. 4 is a photograph showing dust that adhered to an activated carbon electrode plate of the present invention in a test procedure.

FIG. 3 is a photograph showing dust attached to the aluminum plate in the test procedure, and FIG. 4 shows a photograph showing dust attached to the activated carbon electrode plate according to the present invention. As shown in FIG. 4, the amount of dust attached to the activated carbon electrode plate was large and the density of dust attached was very high.

TABLE 2

Comparison of dust adhesion between aluminum electrode plate and activated carbon electrode plate

| Electrode plate | Electrode | Initial electrode weight (g) | Electrode weight (g) after adhesion of dust | Amount of adhesion (mg) | Amount of adhesion per unit area (mg/cm$^2$) |
|---|---|---|---|---|---|
| Aluminum electrode plate | + | 1.0241 | 1.040 | 16.2 | 0.8 |
|  | − | 1.0321 | 1.046 | 13.9 | 0.7 |
| Activated carbon electrode plate | + | 1.5025 | 1.788 | 285 | 14.5 |
|  | − | 1.4475 | 1.714 | 266 | 13.6 |

Figure 5:
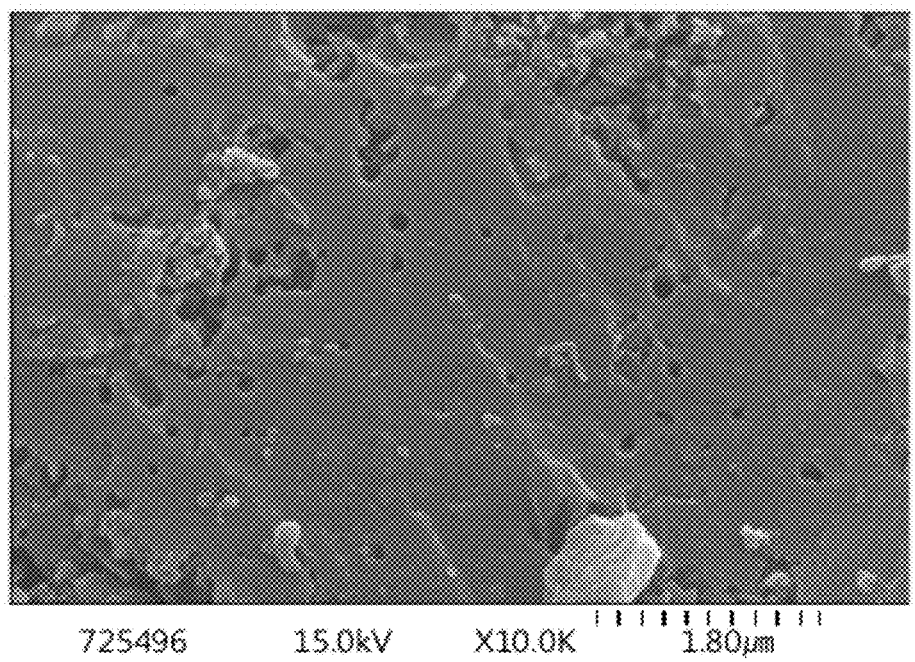
FIG. 5 is an electron micrograph showing the pores of a powdered activated carbon used as the material of an activated carbon electrode plate.
Figure 6:
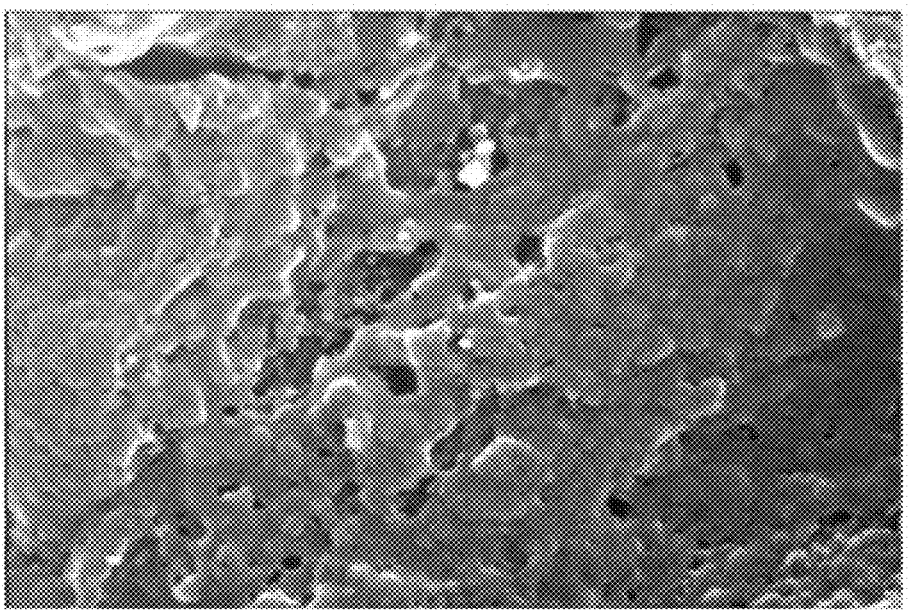
FIG. 6 is an electron micrograph showing the results of examining whether the pores of a powdered activated carbon are open, after filling methanol into the pores of the powdered activated carbon, mixing the activated carbon with a binder and then drying the activated carbon.

FIG. 5 is an electron micrograph showing the results of observing the pores of powdered activated carbon used as the material of the activated carbon electrode, and FIG. 6 is an electron micrograph showing the results of examining whether the pores of activated carbon were open, after filling methanol into the pores of the powdered activated carbon, mixing the powdered activated carbon with a binder and then drying the mixture at 100° C.

As can be seen in FIGS. 5 and 6, even when the binder was added to the activated carbon, the blocked pores were open by filling the solvent such as methanol into the pores of the activated carbon and heating the activated carbon. In addition, the specific surface area of the activated carbon after opening of the pores was measured to be about 800 m$^2$/g which was similar to that of the raw powdered activated carbon.

In order to examine whether the aluminum electrode plate and the activated carbon electrode plate have the ability to remove air pollutants, the abilities of the electrode plates to remove each of air pollutants, including ammonia ($NH_3$) gas, hydrogen sulfide ($H_2S$) gas and benzene, were tested. The results of the test are shown in Tables 3 to 5 below.

As can be seen therein, the aluminum electrode plate had little or no ability to remove air pollutant gases, whereas the activated carbon electrode plate could easily remove even gaseous air pollutants.

TABLE 3

Test results for ammonia ($NH_3$) removal by aluminum electrode plate and activated carbon electrode plate

| Electrode plate | Time (min) | | | | | | |
|---|---|---|---|---|---|---|---|
| | 0 | 3 | 5 | 10 | 20 | 40 | 60 |
| Aluminum electrode plate | 100 ppm | 98 ppm | 97 ppm | 98 ppm | 96 ppm | 97 ppm | 98 ppm |
| Activated carbon electrode plate | 100 ppm | 70 ppm | 50 ppm | 35 ppm | 25 ppm | 15 ppm | 10 ppm |

TABLE 4

Test results for hydrogen sulfide ($H_2S$) removal by aluminum, electrode plate and activated carbon electrode plate

| Electrode plate | Time (min) | | | | |
|---|---|---|---|---|---|
| | 0 | 3 | 5 | 8 | 10 |
| Aluminum electrode plate | 4.5 ppm | 4.0 ppm | 4.2 ppm | 4.3 ppm | 4.0 Ppm |
| Activated carbon electrode plate | 4.5 ppm | 1.2 ppm | 0.8 ppm | 0.1 ppm | 0.01 Ppm |

TABLE 5

Test results for benzene removal by aluminum electrode plate and activated carbon electrode plate

| Electrode plate | Time (min) | | | | |
|---|---|---|---|---|---|
| | 0 | 1 | 2 | 5 | 10 |
| Aluminum electrode plate | 2 ppm | 1.8 ppm | 1.9 ppm | 1.6 ppm | 1.5 ppm |
| Activated carbon electrode | 2 ppm | 0.1 ppm | 0.02 ppm | ND ppm | ND ppm |

As described above, the inventive method for preparing an activated carbon which is used in an activated carbon electrode plate for removal of dust and offensive odor substances, which are air pollutants, an activated carbon prepared thereby, the inventive method for preparing an activated carbon electrode plate, and an activated carbon electrode plate prepared thereby, can maximize the specific surface area of the electrode to make the distribution of current uniform, thereby maximizing the adhesion of dust to the electrode, and can also remove gaseous air pollutants, including volatile organic substances and offensive odor substances.

Specifically, the inventive activated carbon electrode plate prepared by applying porous activated carbon thinly to an electrode substrate can maximize the specific surface area of the electrode to make the distribution of current uniform, thereby maximizing the adhesion of dust to the electrode. In addition, the pores of the activated carbon allow the electrode plate to remove volatile organic substances and offensive odor substances from gases, suggesting that the electrode plate can simultaneously remove dust and gaseous air pollutants.

Although the preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method for preparing an activated carbon electrode plate, comprising the steps of:
    mixing a powdered activated carbon with a binder to form a binder/activated carbon mixture;
    forming an activated carbon slurry from the binder/activated carbon mixture;
    applying the activated carbon slurry to a surface of a conductive material plate; and
    drying the conductive material plate having the activated carbon slurry applied thereto,
    wherein the step of forming the activated carbon slurry is carried out by adding to the binder/activated carbon mixture a volatile solvent which volatilizes at a temperature of 100° C. or higher, and the binder that is used in the step of mixing the powdered activated carbon with the binder is polyvinyl acetate (PVA).

2. The method of claim 1, wherein a highly conductive material for increasing electrical conductivity is further mixed in the step of mixing the powdered activated carbon with the binder.

3. The method of claim 2, wherein the highly conductive material is carbon black.

4. The method of claim 3, wherein the powdered activated carbon, the binder and the carbon black are mixed by weight of 1 part (powdered activated carbon), 0.2 part (binder) and 0.2 part (carbon black).

5. The method of claim 1, wherein the powdered activated carbon is prepared by a method comprising the steps of providing a raw activated carbon, processing the raw activated carbon into a powdered activated carbon, and treating pores of the powdered activated carbon to maintain the pores,
    wherein the step of treating the pores of the powdered activated carbon comprises adding the powdered activated carbon to a volatile solvent volatile at room temperature, and applying a pressure of 1 atm thereto so the pores of the powdered activated carbon are filled with the volatile solvent,
    the raw activated carbon in the step of providing the raw activated carbon is at least one impurity-containing activated carbon of a plant-derived activated carbon and a coal-derived activated carbon,
    the method of preparing the powdered activated carbon comprises a pretreatment step of removing impurities from the powdered activated carbon to obtain a pure activated carbon,
    wherein the pretreatment step comprises the steps of: stirring the impurity-containing powdered activated carbon in a hydrochloric acid solution to elute metal ions from the powdered activated carbon; dehydrating the powdered activated carbon from which the metal ions were eluted; and drying the dehydrated activated carbon to remove water from the pores of the dehydrated activated carbon.

6. The method of claim 5, wherein the step of drying the dehydrated activated carbon comprises drying the dehydrated activated carbon at room temperature and then drying the dehydrated activated carbon at a temperature at which the volatile solvent volatilizes.

7. An activated carbon electrode plate comprising:
a conductive material plate having an activated carbon slurry applied to a surface thereof,
wherein the activated carbon slurry includes a binder/activated carbon mixture of a powdered activated carbon and polyvinyl acetate (PVA), and a volatile solvent which volatilizes at a temperature of 100° C. or higher and is added to the binder/activated carbon mixture.

* * * * *